United States Patent [19]

Jaeger et al.

[11] Patent Number: 6,133,363
[45] Date of Patent: Oct. 17, 2000

[54] PROCESS FOR PRODUCING DISPERSIONS OF WATER-SOLUBLE VINYL POLYMERS AND STABILIZER FOR IMPLEMENTING THE PROCESS

[75] Inventors: Werner Jaeger, Klein-machnow; Arvid Zimmermann; Karl-Heinz Reichert, both of Berlin; Katrin Zeitz, Ludwigs-hafen, all of Germany

[73] Assignee: Fraunhofer-Gesellschaft zur Foerderung der Angewandten Forschung E.V., Munich, Germany

[21] Appl. No.: 08/973,814
[22] PCT Filed: Jun. 10, 1996
[86] PCT No.: PCT/DE96/01063
   § 371 Date: Mar. 6, 1998
   § 102(e) Date: Mar. 6, 1998
[87] PCT Pub. No.: WO96/41821
   PCT Pub. Date: Dec. 27, 1996

[30] Foreign Application Priority Data

Jun. 9, 1995 [DE] Germany ............... 195 21 096

[51] Int. Cl.$^7$ ....................................... C08F 2/16
[52] U.S. Cl. .................. 524/458; 525/92 R; 525/93; 526/201; 526/292.2; 526/292.9; 526/312
[58] Field of Search ............ 525/92 R, 93; 526/201, 292.9, 292.2, 312; 524/458

[56] References Cited

U.S. PATENT DOCUMENTS 5,006,590  4/1991  Takeda et al. ............... 524/458
5,403,883  4/1995  Messner et al. ............ 524/458

*Primary Examiner*—Kriellion Sanders
*Attorney, Agent, or Firm*—Michael B. Martin; Thomas M. Breininger

[57] ABSTRACT

The invention relates to a method of manufacturing dispersions of water-soluble cationic vinyl polymers which can be used as process aids for separation processes, e.g. as flocculation aids, coagulation agents, retention agents or dehydration accelerators. The dispersions are produced by radical homopolymerization of cationic, hydrophobically modified vinyl monomers or their copolymerization with water-soluble vinyl monomers in aqueous saline solutions. In this respect block copolymers are used as dispersion stabilizers, and which are formed from a cationic vinyl monomer and ethyleneoxide.

7 Claims, No Drawings

PROCESS FOR PRODUCING DISPERSIONS OF WATER-SOLUBLE VINYL POLYMERS AND STABILIZER FOR IMPLEMENTING THE PROCESS

This is a 371 of International Application No. PCT/DE96/01063, filed Jun. 10, 1996.

FIELD OF THE INVENTION

The invention relates to a method of manufacturing dispersions of water-soluble cationic vinyl polymers, using block copolymers which are formed from a cationic vinyl polymer and ethylene oxide, as dispersion stabilisers. The invention further relates to the dispersion stabilisers for carrying out the method. In this respect, dispersions with long-term stability are formed at consistently low viscosities of the reaction mixture, and a reaction speed constant up to high yields. The polymer dispersions can be brought into solution by simple dilution with water and then used as process aids for separating processes.

BACKGROUND OF THE INVENTION

Water-soluble cationic vinyl polymers are widely used in industry as process aids for carrying out separation processes by means for example of flocculation, coagulation, retention and dehydration. Among other things, they come into use in water preparation and waste water cleaning, in the paper, coal and metal ore industries, in obtaining petroleum and in the foodstuffs industry. Used mostly in small quantities they have in part gained an importance in determining technology.

Manufacture of these polymers is effected by radical homo- or copolymerisation in the homogeneous or heterogeneous phase (C. L. McCormick, J. Bock and D. N. Schulz: Water-Soluble Polymers, in: Encyclopaedia of Polymer Science and Technology, Wiley, New York, 1989, Vo. 17, Page 730 and following). The homogeneous solution polymerisation in water has the disadvantage that even at polymer contents below 10% by mass, highly-viscous systems are present, which do not permit further increase in the content of active ingredient. The low polymer proportion in the final product leads to poor space/time yields in synthesis and to increased costs in transport to the user. Inverse immersion polymerisation in organic solvents as a carrier phase gives substantially higher contents of solid matter. This however has the disadvantage that using the solvents requires special protective measures, and in application of the products all of the solvents pass into the environment (J. Dautzenberg, W. Jaeger, J. Kötz, B. Phillipp, Ch. Seidel, D. Stscherbina: Polyelectrolytes, Carl Hanser Verlag, Munich 1994, Page 13 and following). Inverse suspension polymerisation in hydrophobic combustible solvents as a carrier phase finally leads, after isolation and drying of the polymers, to pulverulent products. The multi-stage process is however cost-intensive and requires much energy (H. Spoor, Angewandte Makromoleculare Chemie 123/124 (1984) Page 1 and following).

Therefore there was proposed as an alternative the manufacture of dispersions of water-soluble polymers without organic solvents as carrier phase. The document EP 183 466 describes the polymerisation of water-soluble monomers in aqueous solutions of inorganic salts in the presence of polyoles with molecular weights of up to 600 g/mol and/or polyelectrolytes obtained by homopolymerisation of ionic vinyl monomers or their static copolymerisation, as dispersion stabilisers. The Canadian Patent 2 096 472 (DEP 42 16 167.3 1992/05/18) describes the polymerisation of a combination of water-soluble and hydrophobic monomers, if necessary in combination with an amphiphatic monomer, in the presence of a polyalkylene ether or of a polyelectrolyte which is incompatible with the dispersed polymer and has molecular weights of $<5*10^5$ g/mol. The latter serves as a dispersion stabiliser. Preferably, poly(diallyldimethylammoniumchloride) is used. The resultant dispersion-forming polymer has molar masses of at least $10^6$ g/mol.

The disadvantage of the method according to EP 183 466 resides in the fact that the viscosity of the resulting dispersions is still comparatively high. A particular disadvantage however is that during the course of polymerisation viscosity maxima are exceeded, which correspond to the viscosity of solution polymerisations, and thus render the process technology difficult. The disadvantage of the Canadian Patent 2 096 472 is that considerable quantities of dispersion stabiliser, up to 80% by mass with respect to the monomer used, are brought into use. Here also the viscosity of the polymerising system can be greater than the viscosity of the end product. A disadvantage in both named methods is that the resultant dispersions coagulate after relatively short times and therefore the storage capacity is restricted.

SUMMARY OF THE INVENTION

It is therefore the object of the invention to produce, by an industrially simple synthesis method, dispersions of long-duration stability of water-soluble cationic vinyl polymers, a low viscosity of the polymerising system being maintained during the entire reaction. In terms of method, the object is achieved by the characterising features of claim 1, and with reference to the stabiliser by the characterising features of claim 6. The sub-claims show advantageous further developments.

DETAILED DESCRIPTION OF THE PREFERRED EMBODIMENT

Thus the procedure according to the invention is such that water-soluble hydrophobically modified vinyl monomers are radically homopolymerised in aqueous saline solutions or are copolymerised with suitable comonomers, block copolymers from a cationic vinyl monomer and ethylene oxide being used as dispersion stabilisers.

Block copolymers from a cationic vinyl monomer and ethylene oxide are used as dispersion stabilisers. The cationic block of the dispersion stabiliser is formed from monomers of the general formula I,

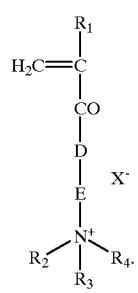

in which $R_1$ is hydrogen or a methyl residue, $R_2$ and $R_3$ are an alkyl residue with 1 to 6 carbon atoms, $R_4$ is alkyl residue with 1 to 6 carbon atoms or a benzyl residue, D is the grouping NH or O, and E is an alkylene residue or hydroxyalkyl residue with 2 to 6 carbon atoms, and X is a halogenide acetate or methosulphate. Further, the cationic block of the block copolymer can be formed from the monomers diallyldimethylammoniumchloride, vinylpyridiniumhalogenide, N-vinylimidazole or N-vinylimidazolium halogenide. The cationic block has a molar mass between 1,000 and 300,000 g/mol. The molar mass of the polyethylene oxide block lies between 200 and 20,000 g/mol. Synthesis of the block copolymer can be effected according to the details in "Macromolecular Design, Concept and Practice" Published Munmaya K. Mishra, Polymer Frontiers International, Inc. Hopewell, USA, Pages 265 and following and 313 and following, via the following stages: 1: Synthesis of a macroinitiator by conversion of polyethylene glycol with azobisisobutyronitrile. 2: Polymerisation of the cationic monomer after the start of the chain by the macroinitiator.

Both cationic and non-ionic monomers can be used as water-soluble, hydrophobically modified vinyl monomers. Cationic hydrophobic vinyl monomers preferably have the general formula II:

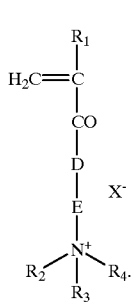

II wherein $R_1$ is hydrogen or a methyl residue, $R_2$ and $R_3$ are an alkyl residue with 1 to 6 carbon atoms, $R_4$ is an alkyl residue with 1 to 6 carbon atoms or a benzyl residue, A is the grouping NH or O, and B is an alkylene residue or hydroxyalkylene residue with 2 to 6 carbon atoms. X represents a halogenide, acetate or methasulphate.

Non-ionic hydrophobic vinyl monomers preferably have a generally formula III $$CH_2=C(R_1)-CO-A-R_2 \qquad \text{III}$$

wherein $R_1$ is hydrogen or a methyl residue, A is the grouping NH or O, and $R_2$ is an alkyl residue with 2 to 10 carbon atoms.

Both cationic and non-ionic water-soluble vinyl monomers can be used as comonomers. Cationic water-soluble comonomers preferably likewise have the general formula II, yet then $R_1$ is hydrogen or a methyl residue, $R_2$, $R_3$ and $R_4$ are a methyl or ethyl residue, A is the grouping NH or O, and B is an alkylene residue or hydroxyalkylene residue with 2 to 4 carbon atoms. X represents a halogenide or methosulphate. Further preferred cationic comonomers are diallyldimethylammoniumchloride, vinylpyridiniumhalogenide, N-vinylimidazole and N-vinylinidazolium halogenide. Non-ion water-soluble comonomers preferably have the general formula IV.

$$CH_2=C(R_1)-CO-N(R_1, R_2) \qquad \text{IV}$$

$R_1$ is hydrogen or a methyl residue, $R_2$ and $R_3$ are hydrogen, an alkyl residue or a hydroxyalkyl residue with 1 to 4 carbon atoms. N-Methyl-N-vinylacetamide can be used as a nonionic water-soluble co-monomer.

Homopolymerisations can be carried out with the water-soluble, hydrophobically modified cationic vinyl monomers of the general formula II. Copolymerisations with the named cationic and/or non-ionic water-soluble vinyl monomers can for example be carried out with the hydrophobically cationic vinyl monomers of the general formula II and also with the non-ionic hydrophobic vinyl monomers of the general formula III.

The polymerisations are carried out in aqueous saline solutions. Inorganic salts such as sodium chloride, sodium sulphate, ammonium chloride, ammonium sulphate, ammonium carbonate, sodium dihydrogenphosphate, disodium hydrogenphosphate and low-molecular polymeric ammonium salts with molar masses<80,000 g/mol, e.g. poly (dimethyldiallylammoniumchloride), or their mixtures can be used as salts. The salts are used in quantities greater than 10% by mass with respect to the overall mass of the reaction batch.

In order to produce the dispersions, for example a hydrophobic monomer of the general formula II or a mixture of these monomers, or a mixture of 1 to 50% by mass or hydrophobic monomers of the general formula II, 0 to 25% by mass of hydrophobic monomers of the general formula III and 99 to 50% by mass of cationic and/or non-ionogenic comonomers (e.g. structures II and IV, diallyldimethylammoniumchloride, N-Methyl-N-vinylacetamide, the total of the monomers and comonomers being 100% by mass, are dissolved in an aqueous saline solution. The aqueous saline solution contains either inorganic salts or low-molecular polymeric ammonium salts in quantities between 10% by mass with respect to the overall mass of the reaction batch, up to the saturation threshold. The proportion of all monomers comes to 10 to 75% by mass, with respect to the overall mass of the reaction batch. Then between 1 and 10% by mass, with respect to the overall mass of the monomers used, of the dispersion stabiliser is added. Polymerisation is carried out in the temperature range from 30 to 90° C., preferably in a range from 40 to 60° C., in inert gas. It is started with conventional radical initiators, for example 2,2'-azobis(2-amidinpropane) hydrochloride. The monomers can be presented at the beginning of the reaction or can be metered in during the course of the reaction. The initiator can be fully or partly added at the beginning of the reaction; in the latter case the residual quantity is metered in during the course of the reaction. The quantity of initiator used comes to $10^{-3}$ to 2% by mass, with respect to the overall reaction batch. The final yield of monomers is >98% by mass, the polymerisation time lies between 30 minutes and 9 hours. The molar mass of the polymers is >$10^6$ g/mol. The viscosities of the dispersions are <10 mPas.

The resultant polymerisation can be converted into polymer solutions ready for use by dilution with water.

A new method of manufacturing dispersions of water-soluble cationic vinyl polymers offers the following advantages in comparison to known methods:
1. Polymerisation extends to high yields at a constant speed.
2. Dispersions of low viscosity are formed. The viscosity of the final dispersion lies only slightly above the viscosity of the outset mixture of monomers, salt, stabiliser and water. No increase in viscosity occurs in the interim.
3. The final dispersion is stable over a long period. Any sediments forming can be re-dispersed by simple shaking even after several months' storage.

The method is explained in more detail by the following examples. The examples however do not represent any restrictions.

EXAMPLE 1

A thermostatable double jacket reactor with regulated internal temperature, with stirrer, reflux condenser, temperature cooler and gas inlet device is filled with water with 238.2 g of a 75% aqueous solution of methylacryloyl-oxyethyl-dimethylbenzylammoniumchloride, 159 g sodium chloride, 9 g stabiliser (block copolymer with a block of polyethylene oxide of the molar mass 2,000 g/mol and a block of poly(methacryloyl-oxyethyl-trimethylammoniumchloride of the molar mass 14,000 g/mol) and 731 g water. The apparatus is then flushed with nitrogen for 1 hour with continuous stirring, and the temperature is thereafter regulated to 50° C. Thereafter a solution of 2.44 g of 2.2' azois(2-amidinopropane) hydrochloride is added to 10 ml water. The batch is kept at 50° C. under constant stirring. The viscosity remains constant over the entire duration of the reaction. After 60 minutes the reaction is finished, the final yield is 99%. The dispersion has a viscosity of 6.5 mPas. The molar mass of the polymer comes to $2*10^6$ g/mol.

EXAMPLE 2

With the same procedure as in Example 1, 130.4 g of methylacryloyl-oxyethyl-dimethylbenzylammoniumchloride, 76 g acrylamide, 159 g sodium chloride, 9 g of the stabiliser from Example 1 and 794 g of water are used. After 60 minutes the reaction is finished. The final yield is 98%, the viscosity of the resultant dispersion is 9 mPas.

EXAMPLE 3

With the same procedure as in Example 1, 130.4 g methylacryloyl-oxyethyl-dimethylbenzylammoniumchloride, 240 g acrylamide, 159 g sodium chloride, 9 g of the stabiliser from Example 1 and 630 g of water are used. After 70 minutes the reaction is finished. The final yield is 98%.

What is claimed is:

1. A method of preparing an aqueous dispersion of a water-soluble cationic homopolymer or copolymer comprising polymerizing monomers using a water-soluble free-radical initiator in an aqueous saline solution in the presence of a stabilizer, the monomers selected from water-soluble cationic hydrophobically modified vinyl monomers or a water-soluble cationic or non-ionic hydrophobically modified vinyl monomer and a comonomer selected from water soluble cationic or non-ionic vinyl monomers, wherein the stabilizer is selected from block copolymers of cationic vinyl monomers and ethylene oxide.

2. The method of claim 1 wherein the cationic block of the block copolymer is formed from monomers of the general formula I:

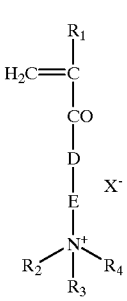

wherein $R_1$ is hydrogen or methyl, $R_2$ and $R_3$ are alkyl of 1 to 6 carbon atoms, $R_4$ is alkyl of 1 to 6 carbon atoms or benzyl, D is NH or 0, E is alkylene of 2 to 6 carbon atoms or hydroxylalkylene of 2 to 6 carbon atoms, and X is a halogenide, acetate or methosulphate.

3. The method of claim 1, wherein the cationic block of the block copolymer is formed from the monomers diallyldimethylammoniumchloride, vinylpyridiniumhalogenide, N-vinylimidazole or N-vinylimidazolium halogenide.

4. The method of claim 1, 2 or 3, wherein the stabiliser is used in quantities of 1 to 10% by mass with respect to the mass of the monomers used.

5. The method of claim 1, 2, 3 or 4, wherein the polymerisation is carried out in a temperature range from 30 to 90° C.

6. The method of claim 1, 2, 3, 4 or 5, wherein the cationic block of the block copolymer has a molar mass between 1,000 and 300,000 g/mol.

7. The method of claim 1, 2, 3, 4, 5 or 6, wherein the polyethylene oxide block of the block copolymer has a molar mass between 200 and 20,000 g/mol.

* * * * *